(12) United States Patent
Höckl

(10) Patent No.: US 7,815,534 B2
(45) Date of Patent: Oct. 19, 2010

(54) ARRANGEMENT OF A PLANETARY GEARSET IN A TRANSMISSION

(75) Inventor: Gerhard Höckl, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 293 days.

(21) Appl. No.: 12/178,917

(22) Filed: Jul. 24, 2008

(65) Prior Publication Data

US 2009/0069140 A1 Mar. 12, 2009

(30) Foreign Application Priority Data

Sep. 7, 2007 (DE) .................. 10 2007 042 714

(51) Int. Cl.
*F16H 31/00* (2006.01)

(52) U.S. Cl. .................................................... 475/146
(58) Field of Classification Search .................. None
See application file for complete search history.

(56) References Cited

U.S. PATENT DOCUMENTS 5,281,190 A * 1/1994 Koivunen .................. 475/116

* cited by examiner

*Primary Examiner*—Dirk Wright
(74) *Attorney, Agent, or Firm*—Davis & Bujold, P.L.L.C.

(57) ABSTRACT

An arrangement is proposed for a planetary gearset (2) with an axially adjacent shift element in a housing (1) of a transmission of a vehicle, such that the planetary gearset (2) is connected to the shift element for torque transfer, and such that a non-destructively detachable connection is provided between the shift element and the planetary gearset (2).

16 Claims, 3 Drawing Sheets

ARRANGEMENT OF A PLANETARY GEARSET IN A TRANSMISSION

This application claims priority from German Application Serial No. 10 2007 042 714.1 filed Sep. 7, 2007.

FIELD OF THE INVENTION

The present invention concerns an arrangement of a planetary gearset with an axially adjacent shift element in a housing of a transmission.

BACKGROUND OF THE INVENTION

From automotive technology, an arrangement of a planetary gearset with an axially adjacent shift element, as components of an automatic transmission of planetary design for a motor vehicle, is known. A planetary gear carrier of a planetary gearset comprises a number of planetary gears mounted on the planetary gear carrier by way of planetary gear bolts. For this, the planetary gear carrier comprises at least one carrier plate or guide plate by which the planetary gearset is connected to the adjacent shift element for torque transfer.

The shift element axially adjacent to the planetary gearset is made as a clutch, which is actuated by an annular cylinder that co-operates with an annular piston to form a pressure chamber. The connection of the clutch to the planetary gearset is made by crimping the annular cylinder of the clutch to the guide plate of the planetary gear carrier. The positively interlocked crimping produces a joint between the annular cylinder of the clutch and the guide plate of the planetary gearset that can only be released by destroying the components concerned so that, if one component of this structural group is damaged, the entire planetary gearset has to be replaced. This leads to greater assembly and maintenance cost and effort with the known arrangement.

Accordingly, the purpose of the present invention is to improve an arrangement of the type described above in such a manner that assembly and maintenance costs and effort are reduced.

SUMMARY OF THE INVENTION

An arrangement of a planetary gearset with an axially adjacent shift element in a housing of a transmission is proposed in which the planetary gearset is connected to the shift element for torque transfer. The connection can be released without destroying the components concerned or to be joined together.

Thanks to the non-destructively detachable connection between the shift element and the gearset, the possibility is provided of retrofitting individual components of the shift element and the planetary gearset, even as far as dismantling the planetary gears. In this way, costs related to waste can be reduced considerably by replacing only the defective components. In addition, recycling of the transmission is made much simpler with the arrangement.

In a possible embodiment of the present invention, a clutch actuated hydraulically by a cylinder can be provided as the shift element. This is connected to a guide plate or carrier plate of the planetary gear carrier of the adjacent planetary gearset so that the connection can be taken apart without destroying the components to be joined. Thus, the shift element can be removed again from the adjacent planetary gear carrier without destroying either of them.

As the detachable connection, any conceivable type of joint can be used, which enables the components concerned to be released from one another without destruction. Preferably, as the detachable connection at least one screw joint or suchlike can be provided. Thus, by way of a suitable screw-bolt the cylinder of the clutch can be fastened onto the planetary gear carrier of the adjacent planetary gearset. For example, the bolt head of the screw joint can rest inside against the bottom area of the annular cylinder and the screw thread can be provided in the guide plate of the planetary gear carrier of the adjacent planetary gearset. Thus, the screw-bolt can be screwed into the thread of the guide plate through the bottom of the cylinder to connect the annular cylinder of the clutch to the planetary gear carrier.

When dismantling is desired, the cylinder can be separated again from the planetary gear carrier simply by unscrewing the screw-bolt. Preferably, in the design described above a washer element or suchlike can be provided between the bolt head and the bottom area of the cylinder so as to increase the clamping length of the screw joint.

In another embodiment of the present invention, for the screw joint the thread can be provided in a separate annular element or suchlike. For example, the annular element can be provided on the side of a planetary gear bolt of the adjacent planetary gearset facing away from the clutch. Thus, the screw-bolt is passed through the bottom area of the cylinder and along a bore of the planetary gear bolt and screwed into the thread of the annular element. Other design versions and modifications of the screw joint are also conceivable. When a separate annular element is used, a further advantage is that the annular element can be used as an oil collector plate. Thereby, an oil collection plate and bores for supplying oil to a hollow shaft of the transmission, which would otherwise be provided on the inside diameter of the cylinder, can be omitted.

A further development can provide that the annular element has a way to secure it against rotation so that the screw attachment of the screw-bolts in the annular element is ensured. Moreover, it can be advantageous for the annular element to be made springy. In this way, any play between the contact surface on the planetary bolt and the contact surface on the drive output shaft can be compensated. Since the lubrication bore in the drive output shaft and the sun gear shaft of the planetary gearset and the oil collector plate on the sun gear shaft can be omitted, the design of the annular cylinder in the area of the lubrication oil feed for the planetary bolts can be simpler.

In a further embodiment of the invention, it can be provided that when a screw joint is used, again through the planetary bolts, the screw-bolt head is located on the drive output side. This means that the thread is provided in the bottom area of the annular cylinder. In this version, the oil duct bore for lubricating the planetary gear bolts can be positioned further away from the drive output side on the drive output shaft.

In another embodiment of the invention, instead of a screw joint a rivet joint can be provided between the annular cylinder and the guide plate. For this purpose, the cylinder can be enlarged radially outward, so that this area can be joined to the guide plate by at least one rivet or suchlike. To separate the cylinder from the drive output shaft or the planetary gear carrier, it is only necessary to drill out the rivet. This does not damage the components concerned, which can be re-used.

The arrangement proposed can preferably be used in an 8-gear automatic transmission, for example to detachably connect the clutch adjacent to the fourth planetary gearset to the planetary gear carrier of the fourth planetary gearset in such a manner that when the joint is taken apart, the components concerned are not destroyed. Other application areas too are conceivable.

BRIEF DESCRIPTION OF THE DRAWINGS

The invention will now be described, by way of example, with reference to the accompanying drawings in which.

DETAILED DESCRIPTION OF THE INVENTION

Figure 1:
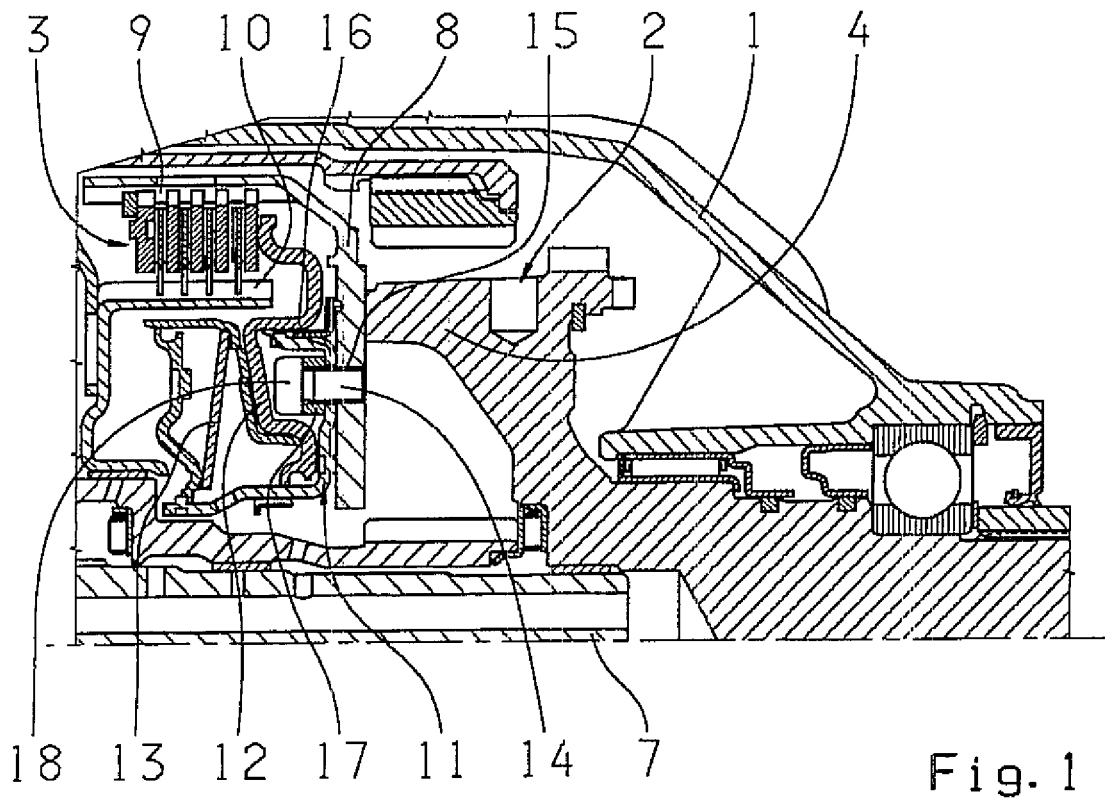
FIG. 1 is a schematic sectional view of a first embodiment of an arrangement of a planetary gearset with an axially adjacent shift element in a transmission according to the invention.

In each case, FIGS. 1 to 5 show a section of a housing 1 of an automatic transmission for a vehicle. The sections comprise in each case a possible embodiment of the arrangement of a planetary gearset 2 with an axially adjacent shift element in the transmission. In the embodiments illustrated, the shift element is made as a clutch 3, but only those components that are needed for an understanding of the invention are described and indexed.

The planetary gearset 2 comprises a planetary gear carrier 4 with several planetary gears, only one planetary gear 5 being shown in the Figures. The planetary gears 5 are each mounted on the planetary gear carrier 4 by planetary gear bolts 6. The planetary gear carrier 4 is mounted via a hub on a drive output shaft 7. In addition, the planetary gear carrier 4 comprises at least one guide plate or carrier plate 8 with bores to receive the planetary gear bolts 6 on which the planetary gears 5 are then mounted to rotate.

In the usual way, the clutch 3 comprises an outer disk carrier 9, which is attached to the guide plate 8. The outer disk carrier 9 has outer disks engaged in alteration with inner disks held on an inner disk carrier 10. To actuate the clutch 3, an annular cylinder 11 is provided, in which an annular piston 12 is held and able to slide axially. Together with the annular piston 12, the annular cylinder 11 forms a pressure chamber. In addition, a cup spring 13 is provided for restoring the annular piston 12.

The clutch 3 and the planetary gearset 2 are detachably connected to one another in such a manner that the components concerned can be taken apart from one another again without being destroyed. In the embodiments shown in FIGS. 1 to 3, this detachable connection is made as a screw joint. In the embodiment shown in FIG. 4, the non-destructively detachable connection is a rivet joint.

In FIG. 1, the screw joint is such that a screw-bolt 14 can be screwed into a thread cut as an internal thread 15 in a bore of the guide plate 8. For this, the bore extends through a bottom area 16 of the annular cylinder 11, through which the screw-bolt 14 is passed in order to be screwed into the internal thread 15 of the guide plate 8. To increase the clamping length of the screw joint, a washer element 17 is provided between a screw head 18 of the screw-bolt 14 and the bottom area 16 of the annular cylinder 11. Thanks to the screw joint used, the annular cylinder 11 can be detached again non-destructively from the planetary gear carrier.

Figure 2:
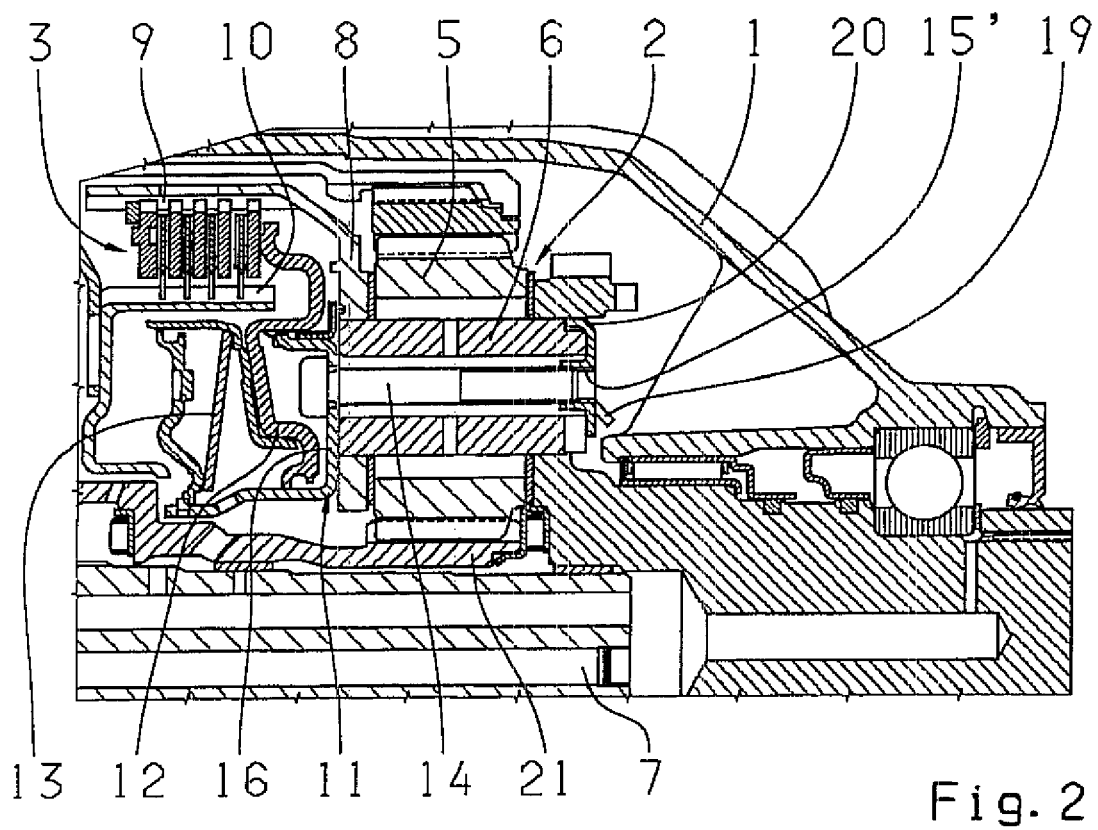
FIG. 2 is a schematic sectional view of a second embodiment of the arrangement.

FIG. 2 shows a second embodiment of the arrangement in which the screw joint is formed through the planetary gear bolt 6 of the planetary gear carrier 4. For this, the screw-bolt 14 is again passed from the clutch side through the bore in the bottom area 16 of the annular cylinder 11 and along a further bore through the planetary gear bolt 6, to be screwed into a separate annular element 19 on the side remote from the clutch. The annular element 19 again has an internal thread 15' into which the screw-bolt 14 can be screwed.

By virtue of the shape of the annular element 19, it also serves as an oil collection plate. In addition, the annular element 19 has an angled portion 20 which acts to secure the planetary bolt 6 rotationally. In this design version, the flow of lubrication oil takes place through a bore in the drive output shaft 7 and an oil outlet groove in the transmission housing 1. The annular element 19 is made to be springy. In this way, any play between the contact surface on the planetary gear bolt 6 and the contact surface on the drive output shaft 7 can advantageously be compensated. Thanks to the function of the annular element 19 as an oil collector plate, there is no need for lubrication bores in the output shaft 7 and a sun gear shaft 21 or for an oil collector plate on the sun gear shaft 21. The shape of the annular cylinder 11 in the area of the lubrication oil feed for the planetary gear bolts 6 can therefore be made simpler.

Figure 3:
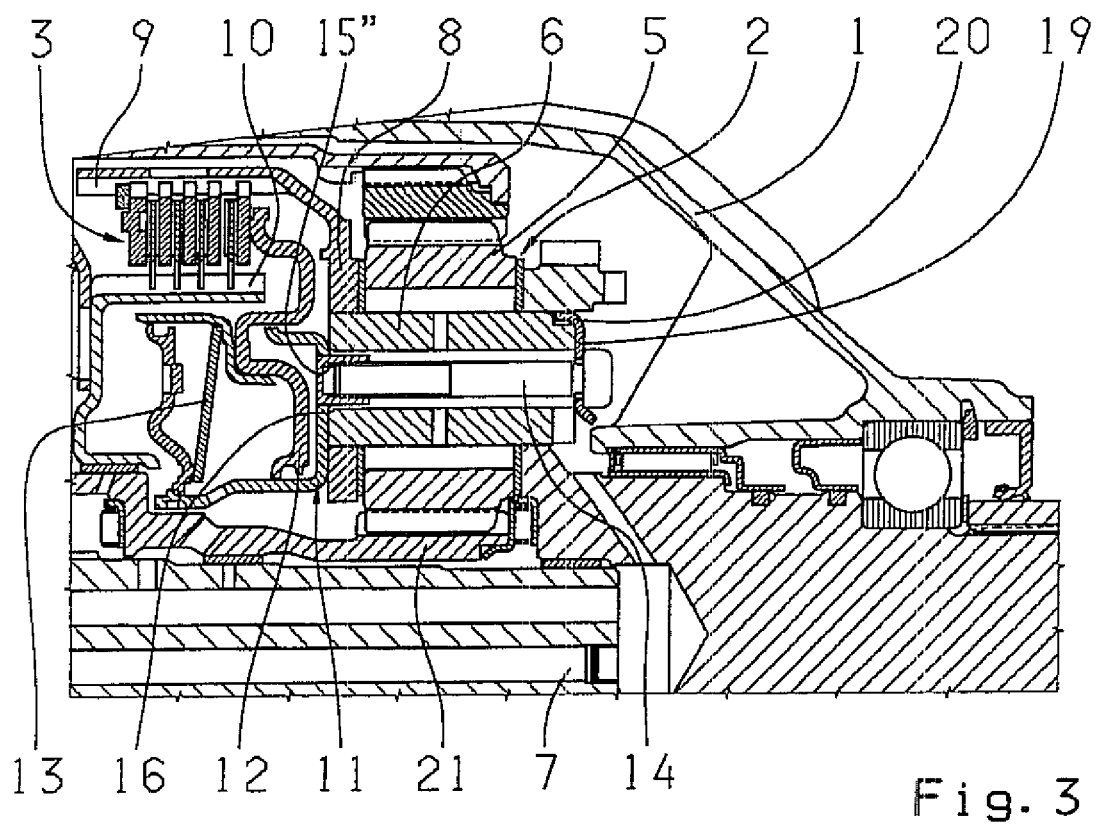
FIG. 3 is a schematic sectional view of a third embodiment of the arrangement.

FIG. 3 shows a third embodiment of the invention in which the screw joint is again formed through the planetary gear bolt 6, but the screw head 18 of the screw-bolt 14 is located on the drive output side, i.e., on the side remote from the clutch 3. Compared with the second embodiment in FIG. 2, an internal thread 15" is, in this case, provided in the bottom area 16 of the annular cylinder 11. The annular element 19 is also present in this embodiment. However, it has no thread, but only a bore for the screw-bolt 14 to pass through.

Figure 4:
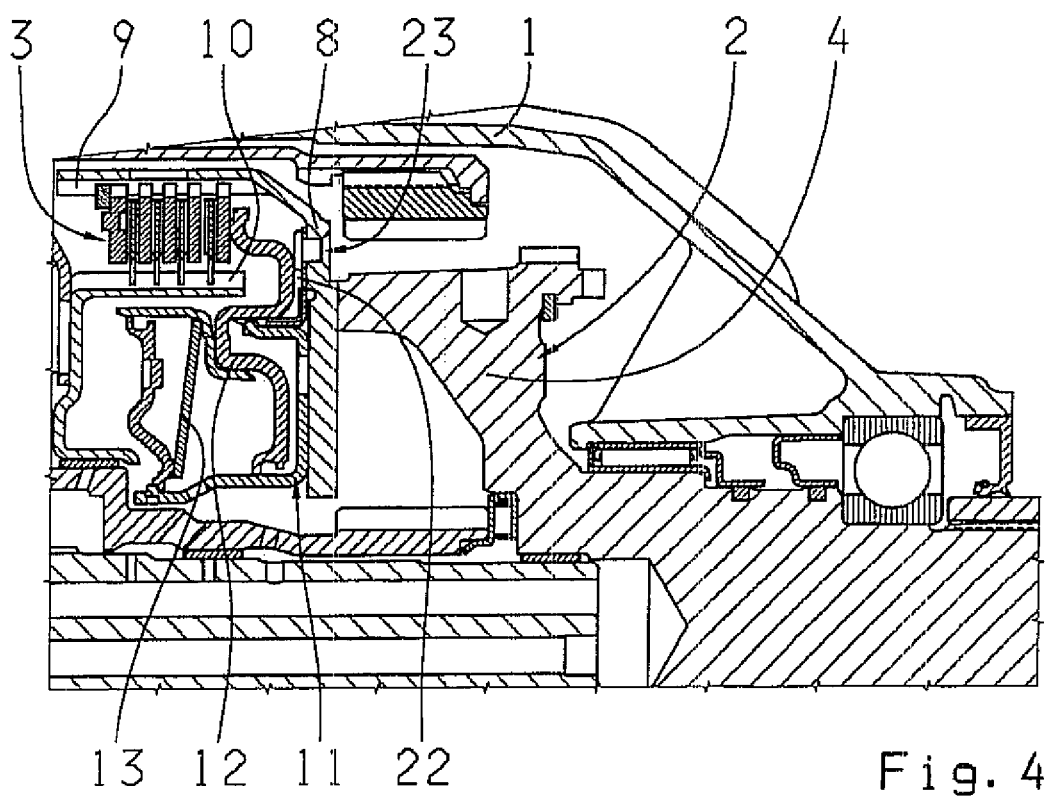
FIG. 4 is a schematic sectional view of a fourth embodiment of the arrangement.

FIG. 4 shows a fourth embodiment variant of the arrangement. In this embodiment, a riveted joint is provided as the connection between the shift element and the planetary gearset 2. For this purpose, the annular cylinder 11 is enlarged radially outward by a corresponding extension 22. By means of this extension 22, the annular cylinder 11 is riveted to the guide plate 8. To release the annular cylinder 11 from the output shaft 7 or the planetary gear carrier 4 again, a rivet 23 can be drilled out. This damages neither of the components to be joined, which can be re-used after dismantling.

Figure 5:
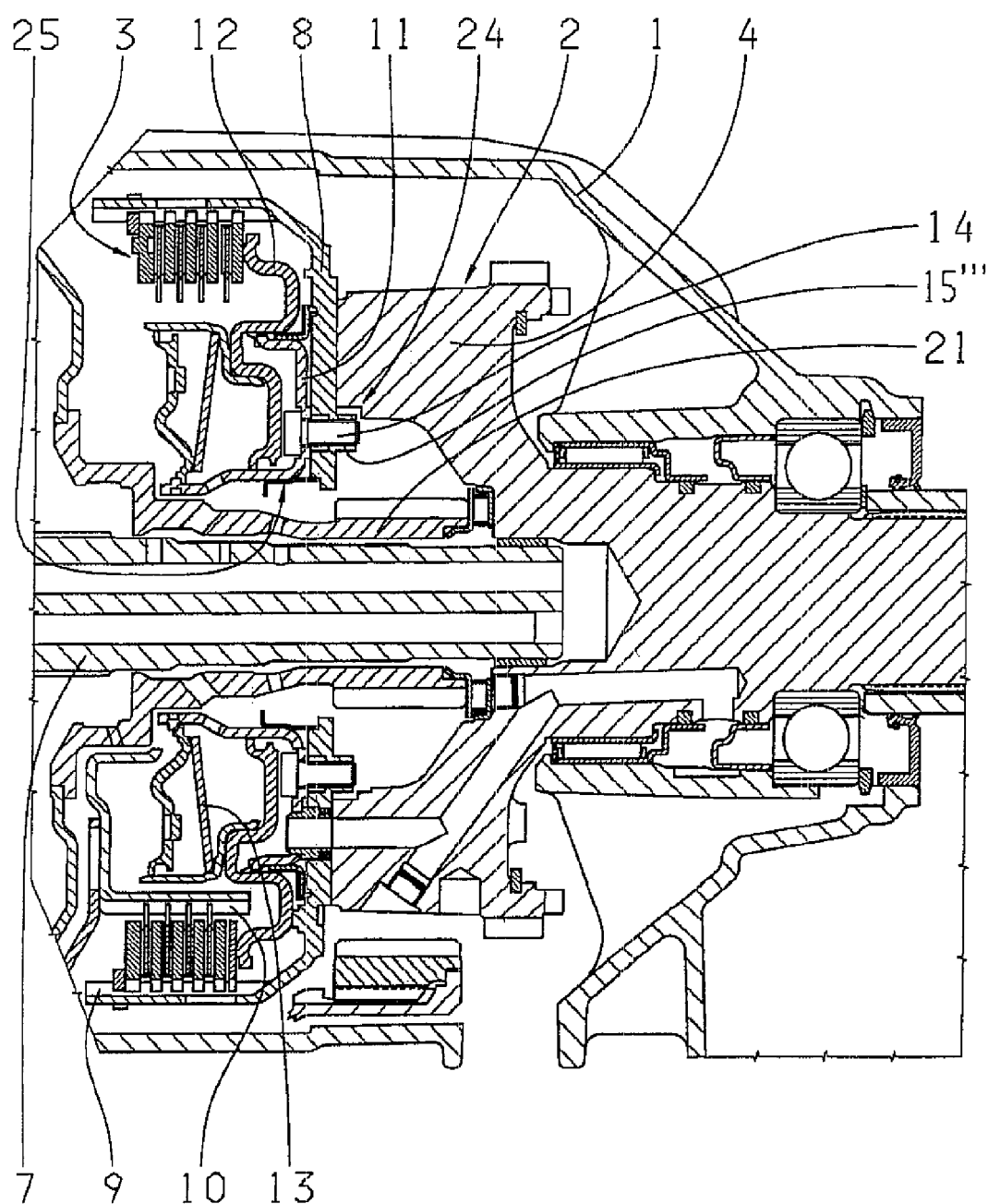
FIG. 5 is a schematic sectional view of a fifth embodiment of the arrangement.

FIG. 5 shows a fifth embodiment of the arrangement, which is based on the first embodiment shown in FIG. 1. In contrast to FIG. 1, an internal thread 15''' is this time made in the guide plate 8 for the screw-bolt 14 as a through-going thread or threaded bore. In this case the planetary gear carrier 4 has a recess 24 to allow the screw-bolts 14 to be fitted. No washer is needed between the bolt head and the guide plate 8. The annular cylinder 11 is centered on the guide plate 8 by an annular element 25 acting as an oil collector plate on an inside diameter of the guide plate in the area next to the sun gear teeth of the sun gear shaft 21. Compared with the first embodiment shown in FIG. 1, the fifth embodiment advantageously takes up less structural space and also requires fewer components.

REFERENCE NUMERALS 1 housing
2 planetary gearset
3 clutch
4 planetary gear carrier
5 planetary gear
6 planetary gear bolt 7 drive output shaft
8 guide plate
9 outer disk carrier
10 inner disk carrier
11 annular cylinder
12 annular piston
13 cup spring
14 screw-bolt
15, 15' internal thread
15", 15'" internal thread
16 bottom area
17 washer element
18 screw head
19 annular element
20 angled section
21 sun gear shaft
22 extension
23 rivet
24 recess in the planetary gear carrier
25 annular element

The invention claimed is:

1. An arrangement of a planetary gearset (2) with an axially adjacent hydraulic clutch (3) in a housing (1) of a transmission of a vehicle,
wherein a connection couples the planetary gearset (2) to the clutch (3) such that torque is transferred therebetween,
the hydraulic clutch (3) is actuated by an annular cylinder (11), and
the annular cylinder (11) is detachably connected to a guide plate (8) of a planetary gear carrier (4) of the planetary qearset (2), and
the connection between the hydraulic clutch (3) and the planetary gearset (2) is non-destructively detachable.

2. The arrangement according to claim 1, wherein the detachable connection is at least one screw joint.

3. The arrangement according to claim 2, wherein the screw joint includes a screw-bolt (14) with a bolt head (18) that rests against an inside of a bottom area (16) of the annular cylinder (11) and the screw-bolt (14) engages a thread (15) which is provided in the guide plate (8).

4. The arrangement according to claim 3, wherein a washer element (17) is provided between the bolt head (18) and the bottom area (16) of the annular cylinder.

5. The arrangement according to claim 2, wherein the screw joint includes a screw-bolt (14) that engages a thread (15) in an annular element (19).

6. The arrangement according to claim 5, wherein the annular element (19) is in contact with a planetary gear bolt (6) on a side of the planetary gear bolt (6) remote from the shift element.

7. The arrangement according to claim 6, wherein the annular element (19) is an oil collector plate.

8. The arrangement according to claim 6, wherein the annular element (19) has an angled section (20).

9. The arrangement according to claim 6, wherein the annular element (19) is springy.

10. The arrangement according to claim 2, wherein the thread (15) is provided in the bottom area (16) of the annular cylinder (11).

11. The arrangement according to claim 1, wherein the annular cylinder (11) is connected to the guide plate (8) by a rivet joint.

12. The arrangement according to claim 11, wherein the annular cylinder (11) has a radial extension (22).

13. The arrangement according to claim 12, wherein the extension (22) is connected to the guide plate (8) by a rivet (23).

14. The arrangement according to claim 1, wherein an annular piston (12) is accommodated and axially slidable within the annular cylinder (11) for actuating the hydraulic clutch (3), and the annular cylinder (11) and the annular piston (12) together form a pressure chamber.

15. An arrangement of a planetary gearset (2) and a hydraulic clutch (3) which are axially adjacent in a housing (1) of a vehicle transmission, the planetary gearset having a planetary gear carrier (4) which comprises at least one guide plate (8), the hydraulic clutch (3) being actuated by a pressure chamber comprising an annular piston (12) and an annular cylinder (11), and the annular cylinder (11) being detachably coupled to the planetary gear carrier (4) by a threaded bolt (14) coupling.

16. An arrangement of a planetary gearset (2) and a hydraulic clutch (3) which are axially adjacent in a housing (1) of a vehicle transmission, the planetary gearset having a planetary gear carrier (4) which comprises at least one guide plate (8), the hydraulic clutch (3) being actuated by a pressure chamber comprising an annular piston (12) and an annular cylinder (11), and the annular cylinder (11) being detachably coupled to the planetary gear carrier (4) by a rivet (23) coupling.

* * * * *